United States Patent [19]
Johnson

[11] Patent Number: 5,228,484
[45] Date of Patent: Jul. 20, 1993

[54] AIR LANCE REEL FOR CATALYST UNLOADING OF TUBULAR REACTORS

[75] Inventor: Kelly J. Johnson, Prospect, Ky.

[73] Assignee: Catalyst Technology, Inc., Buckner, Ky.

[21] Appl. No.: 718,132

[22] Filed: Jun. 20, 1991

[51] Int. Cl.⁵ .................................................. B08B 9/06
[52] U.S. Cl. ........................................ 141/65; 141/67;
  141/91; 134/166 C; 134/169 C; 15/345;
  15/315; 242/86.2
[58] Field of Search .................. 141/7, 67, 65, 1, 91,
  141/92; 134/166 C, 167 C, 168 C, 169 C;
  15/315, 345; 254/360; 242/86, 86.2, 86.51

[56] References Cited

U.S. PATENT DOCUMENTS

| | | | |
|---|---|---|---|
| 3,916,960 | 11/1975 | Thompson | 141/1 |
| 4,115,070 | 9/1978 | Jukkola et al. | 141/67 X |
| 4,669,145 | 6/1987 | Kehr | 15/315 X |
| 4,820,496 | 4/1989 | Sapoff | 422/197 |
| 4,896,686 | 1/1990 | Schmidt, Jr. et al. | 134/167 C |
| 4,935,984 | 6/1990 | Bryant et al. | 134/168 CX |
| 4,993,443 | 2/1991 | Buchert | 134/167 C |
| 4,4,994,291 | 2/1991 | Sapoff | 141/65 X |
| 5,028,314 | 7/1991 | Goldberger et al. | 209/216 R |
| 5,114,685 | 5/1992 | Sapoff | 141/7 X |

Primary Examiner—Ernest G. Cusick

[57] ABSTRACT

An air lance comprises a plastic tube supplied with air at high pressure and having an air outlet. The lance is inserted into catalyst tubes and supplies air for breaking up the catalyst for removal by vacuum means. An air-powered reel is used to dispense and retrieve the plastic lance when emptying the catalyst tubes.

4 Claims, 1 Drawing Sheet

AIR LANCE REEL FOR CATALYST UNLOADING OF TUBULAR REACTORS

BACKGROUND OF THE INVENTION

1. Field of the Invention

This invention relates to the field of unloading devices for removing catalyst from within the tubes of a reactor.

In unloading flowable granular or particle catalyst from the tubes of a multi-tube reactor, difficulties have been encountered in removing catalyst that has become lodged within the tubes during reactor operation. In some previous instances, the particle catalyst completely blocked or bridged some or all of the tubes of the reactor due to heat, composition changes and the like, and retarded or blocked movement or flow of the catalyst from the tubes of the reactor.

2. Description of the Prior Art

U.S. Pat. No. 3,916,960 discloses an apparatus for unloading catalyst which includes a head positionable adjacent open ends of a plurality of reactor tubes for creating a pressure differential in the reactor tubes for flowing the catalyst from the reactor tubes into a chamber formed by the head. The head mounts a manifold system having a plurality of lances of appropriate preselected length and diameter discharging a controlled stream of fluid into the tubes for dislodging bridging catalyst in the reactor tubes and circulating the catalyst from the tubes.

In U.S. Pat. No. 4,820,496, several tubes can be unloaded by gravity, and the stuck or bridge-over catalyst can be dislodged by reciprocation or by air jets with essentially complete containment of dust and with complete recovery of catalyst. Additionally, Applicant acknowledges prior use of a hand-cranked air lance reel by BASF, Inc. a Louisiana corporation. This unit was similar to a garden hose reel. No literature is available.

SUMMARY OF THE INVENTION

The present invention relates to the field of a new and improved method and apparatus for unloading catalyst lodged within the tubes of a multi-tube reactor. An air lance comprises a length of plastic tubing fed by a source of high pressure gaseous fluid, said tubing being wound on a drum which dispenses the tubing through the reactor tube. The lance is inserted into a reactor tube which is to be emptied and any lodged catalyst within the reactor tube is dislodged and broken up by the high pressure gas jet. The loosened, fluidized catalyst is simultaneously withdrawn by an appropriate vacuum system. The invention is particularly applicable to jacketed multi-tube reactors used in the production of ethylene dichloride (EDC), ethylene oxide, phthalic anhydride, maleic anhydride, acrylic acid, vinyl chloride monomer (VCM) and vinyl acetate, but is not limited to such uses.

DESCRIPTION OF THE PREFERRED EMBODIMENTS

Figure 1:
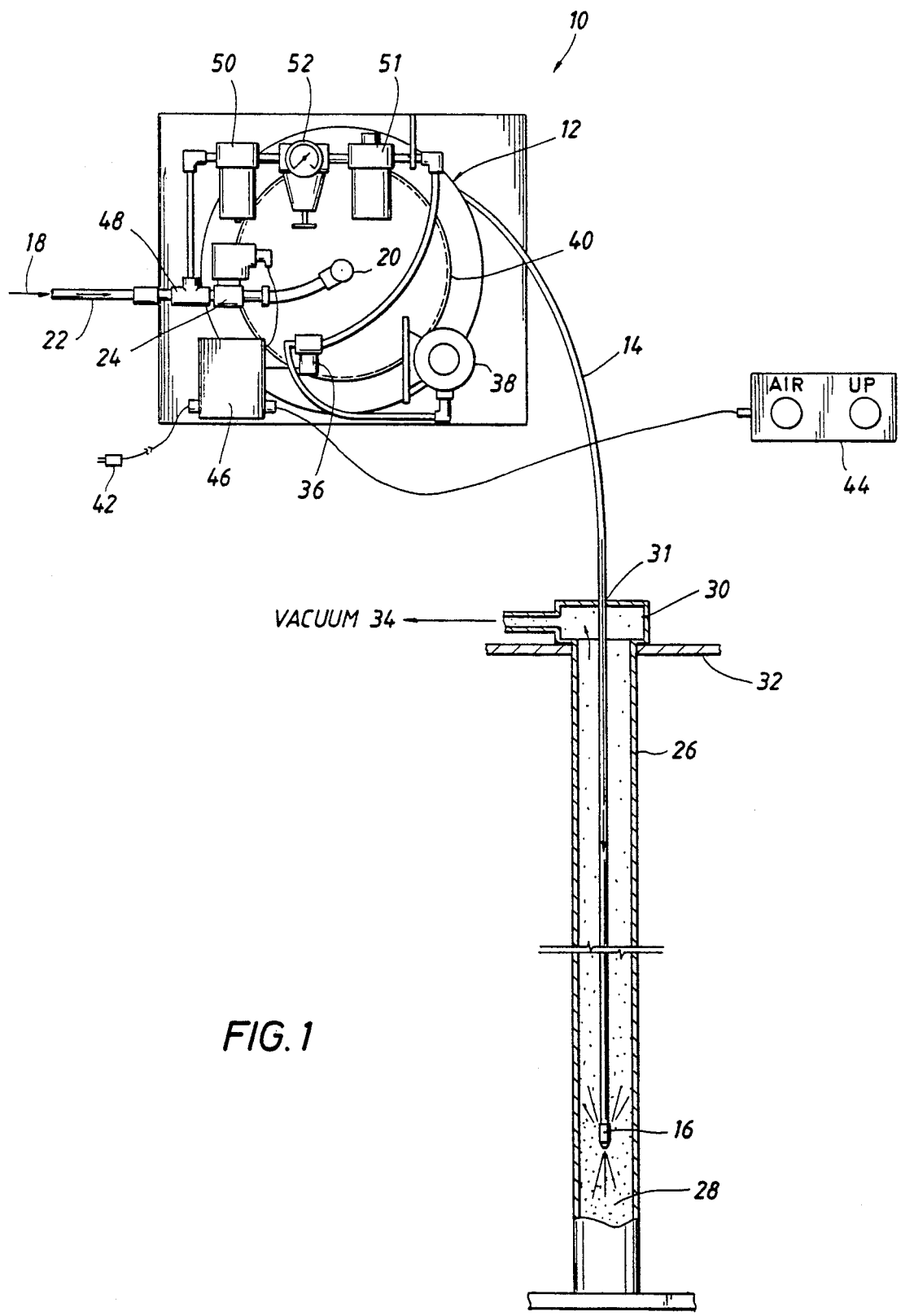
FIG. 1 is a schematic of the electrical and pneumatic configuration of the invention.

The air lance reel is an apparatus for controlling the movement of a flexible air line down into a reactor tube and up out of the tube. The reactor tube is filled with catalyst that must be removed and the air line blows the catalyst out of the tube and into a vacuum line. The reactor tubes may range in diameter from 24 mm to 55 mm and may be 10-60 feet in length.

The reel system, generally designated as 10, comprises a drum 12 on which is wound a lance 14. The lance 14 is a length of flexible tubing e.g. plastic through which is fed a source of high pressure gas e.g., air at 150-300 psi. The lance 14 is terminated by a nozzle 16. The lance is connected to a source of high pressure air or other gas 18 through a pressure-tight rotary seal and feed-through 20 located at the axis of the drum 12. The feed-through 20 is connected to suitable high pressure tubing 22 to the high pressure source 18. Installed in the high pressure tubing 22 is a SUPPLY solenoid 24 which, when energized, opens a valve therein allowing the high pressure source 18 to supply air to the lance 14 through feed-through 20. The operator then feeds the lance 14 through an opening 31 in plenum chamber 30 into the reactor tube 26 while unwinding it from the drum 12 to traverse the length of the reactor tube 26. Catalyst 28 within the reactor tube 26 is loosened and fluidized by the air jet and is forced up the reactor tube 26 into the plenum chamber 30, located on top of the tube sheet 32, where it is removed by vacuum source 34.

It is not necessary to seal the lance entrance opening 31 in plenum chamber 30 since a negative pressure is created in the plenum chamber 30 due to the fact that the vacuum system 34 consumes more cubic feet per minute (cfm) than the air lance 14 produces. The reactor tube 26 is sealingly connected to the plenum chamber 30.

When the catalyst 28 is completely removed by vacuum source 34 from a reactor tube 26, REWIND solenoid 36 is activated which supplies air to air motor 38 causing gear wheel 40 to rotate drum 12 and rewind the lance 14 onto drum 12. When the lance 14 is completely withdrawn from reactor tube 26, the operator inserts the nozzle 16 of the lance 14 into another reactor tube (not shown) and the process is repeated until all reactor tubes 26 have been emptied of catalyst 28. The number of reactor tubes 26 may vary from 150 to 28,000 for example.

The SUPPLY and REWIND solenoids 24, 36, respectively are supplied electrical power from an external power source 42 through a control box 44 and relay box 46. Control box 44, in the preferred embodiment, is foot-operated but could be made smaller for hand-held operation. By closing the AIR switch on control box 44, SUPPLY solenoid 24 is supplied electrical power thereby opening the valve and supplying air to the lance 14 through rotary seal 20. High pressure air is constantly supplied to REWIND solenoid 36 through the T-connector 48, filter 50, an air motor oiler 51, and pressure regulator 52. When the reactor tube 26 is emptied of all its catalyst 28 the operator closes the UP switch on control box 44 thereby supplying electrical power to REWIND solenoid valve 36 and allowing high pressure air to be supplied to air motor 38. Air motor 38 then turns the drum 12 and causes the lance 14 to rewind onto the drum 12 as previously described. High pressure air may be supplied to air lance 14 throughout the rewind operation.

What is claimed is:

1. An apparatus for unloading catalyst from a vertical reactor tube comprising:

a vertical reactor tube containing a quantity of catalyst to be removed therefrom;

a plenum chamber sealingly connected to the top end of said reactor tube;

means for applying a vacuum to said plenum chamber;

an air lance adapted for insertion through said plenum chamber and into said reactor tube, said air lance being terminated by a nozzle;

a source of pressurized gaseous fluid;

a first high pressure fluid line connected between said source of pressurized gaseous fluid and said air lance;

first valve means in said first high pressure fluid line for controlling the flow of high pressure gaseous fluid to said air lance wherein said valve means comprises a solenoid-controlled valve for opening and closing said first high pressure fluid line;

a drum for selectively storing, paying out and rewinding said air lance;

air-driven motor means connected to said drum for rotating said drum and rewinding said air lance onto said drum;

a second high pressure fluid line connected between said source of pressurized gaseous fluid and said air motor; and second valve means in said second high pressure fluid line for controlling the flow of high pressure gaseous fluid to said air motor.

2. The apparatus of claim 1 wherein said second valve means comprises a solenoid-controlled valve for opening and closing said second high pressure fluid line.

3. The apparatus of claim 2 further comprising a control box for selectively supplying electrical power to said solenoid-controlled valves.

4. The apparatus of claim 3 wherein said control box is foot-activated.

* * * * *